US011038325B2

(12) United States Patent
Mohlman (10) Patent No.: US 11,038,325 B2
(45) Date of Patent: Jun. 15, 2021

(54) AIRCRAFT ELECTRICAL RACETRACK SYSTEMS AND METHODS

(71) Applicant: The Boeing Company, Chicago, IL (US)

(72) Inventor: Shawn David Mohlman, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/520,081

(22) Filed: Jul. 23, 2019

(65) Prior Publication Data

US 2021/0028608 A1 Jan. 28, 2021

(51) Int. Cl.
*H02G 1/06* (2006.01)
*H02G 3/04* (2006.01)
*H02G 3/38* (2006.01)
*B64D 31/14* (2006.01)

(52) U.S. Cl.
CPC ............. *H02G 3/0456* (2013.01); *H02G 1/06* (2013.01); *H02G 3/0437* (2013.01); *B64D 31/14* (2013.01)

(58) Field of Classification Search
CPC ...... H02G 3/0456; H02G 1/06; H02G 3/0437; H02G 1/08; H02G 3/04; H02G 3/0406; H02G 3/0418; H02G 3/0487; H02G 3/38; H02G 3/32; B64D 31/14; B64D 47/00; B64D 2221/00; G02B 6/4459; B60R 16/0215; B64C 7/00
USPC ......................................... 174/70 R, 97, 68.3
See application file for complete search history.

(56) References Cited

U.S. PATENT DOCUMENTS

| 5,023,791 | A | * | 6/1991 | Herzberg | ............ | G05B 23/0256 |
| | | | | | | 324/73.1 |
| 9,373,943 | B1 | * | 6/2016 | Tannenbaum | ....... | H02G 3/0437 |
| 10,689,129 | B1 | * | 6/2020 | Nehmeh | ................... | H02J 7/34 |
| 2006/0044722 | A1 | * | 3/2006 | Wavering | ................... | H02J 4/00 |
| | | | | | | 361/62 |
| 2009/0026318 | A1 | | 1/2009 | Gross et al. | | |
| 2010/0204854 | A1 | * | 8/2010 | Chang | ..................... | H04L 67/12 |
| | | | | | | 701/14 |
| 2011/0163203 | A2 | * | 7/2011 | Tsirangelos | ........ | B64D 11/0624 |
| | | | | | | 244/118.5 |

(Continued)

FOREIGN PATENT DOCUMENTS

| DE | 102016115706 | 3/2018 |
| EP | 2482401 | 8/2012 |
| WO | WO 2014/165904 | 10/2014 |

OTHER PUBLICATIONS

A330_Flight_Deck_and_Systems—pp. 1.1-14.7—Mar. 1999.*
FAST53_Airbus Tech Magazine_pp. 1-40_Jan. 2014.*

*Primary Examiner* — Timothy J Thompson
*Assistant Examiner* — Guillermo J Egoavil
(74) *Attorney, Agent, or Firm* — Haynes and Boone, LLP (57) ABSTRACT

Systems and methods for a wiring racetrack for aircraft are described herein. The wiring racetrack can include a wiring pallet with a plurality of channels. A plurality of different wiring groups can each be disposed within one of the channels. Each of the wiring groups can include wiring of exclusively one category or one category and neutral wires. Connectors can be electrically coupled to the wires of the group. Fabrication of the wiring racetrack can be automatically performed by one or more robots that include an end effector and a robotic transfer unit.

20 Claims, 8 Drawing Sheets

(56) References Cited

U.S. PATENT DOCUMENTS

2016/0048631 A1* 2/2016 Campos .................. G06F 30/18
  703/1
2017/0167637 A1* 6/2017 Webb ...................... F16L 3/223
2020/0006927 A1* 1/2020 O'Shaughnessy ... H02G 3/0437

* cited by examiner

AIRCRAFT ELECTRICAL RACETRACK SYSTEMS AND METHODS

TECHNICAL FIELD

The disclosure relates generally to aircraft electrical systems and, more particularly, to electrical racetracks used in aircraft electrical systems.

BACKGROUND

Aircraft wiring systems generally include a collection of different types of wires. Currently, the wires are placed in prefabricated wire bundles that are terminated into individual connectors. For some applications where the wire routes longitudinally fore/aft in the aircraft, the bundles are then installed on the racetracks. Such fabrication and installation can include many manual processes that can introduce human error, lead to quality issues, increase fabrication costs, and decrease fabrication throughput. Additionally, the connectors used in current racetrack fabrication can result in poor ergonomic working conditions within confined spaces when the racetrack is installed into the aircraft and the interfacing connectors are mated.

Furthermore, current techniques of fabricating wiring racetracks require bespoke instructions for different aircraft models. Such current techniques are not scalable and, accordingly, require reconfiguration for aircrafts of different sizes.

SUMMARY

Systems and methods are disclosed for an aircraft with a wiring racetrack. The aircraft can include a fuselage with a wiring racetrack and secondary wiring. The wiring racetrack can include a first wire group including one or more wires of exclusively a first category, a second wire group including one or more wires of exclusively a second category distinct from the first category, a wiring pallet including a first track and a second track, where the one or more wires of the first category are contained exclusively within the first track, and where the one or more wires of the second category are contained exclusively within the second track, a first connector electrically coupled to each of the wires of the first wire group, and a second connector electrically coupled to each of the wires of the second wire group.

In another example, a method is disclosed. The method can include fabricating a wiring racetrack. Fabricating the wiring racetrack can include sorting a plurality of wires into at least a first wire group and a second wire group, where the first wire group includes one of more wires of exclusively a first category and the second wire group includes one or more wires of exclusively a second category distinct from the first category, disposing the first wire group exclusively within a first track of a wiring pallet, disposing the second wire group exclusively within a second track of the wiring pallet, electrically coupling a first connector to each of the wires of the first wire group, and electrically coupling a second connector to each of the wires of the second wire group.

In a further example, an aircraft wiring racetrack is disclosed. The aircraft wiring racetrack can include a first wire group including one of more wires of exclusively a first category, a second wire group including one or more wires of exclusively a second category distinct from the first category, a wiring pallet including a first track and a second track, where the one or more wires of the first category are contained exclusively within the first track, and where the one or more wires of the second category are contained exclusively within the second track, a first connector electrically coupled to each of the wires of the first wire group, and a second connector electrically coupled to each of the wires of the second wire group.

The scope of the invention is defined by the claims, which are incorporated into this section by reference. A more complete understanding of the disclosure will be afforded to those skilled in the art, as well as a realization of additional advantages thereof, by a consideration of the following detailed description of one or more implementations. Reference will be made to the appended sheets of drawings that will first be described briefly.

BRIEF DESCRIPTION OF THE DRAWINGS

Examples of the disclosure and their advantages are best understood by referring to the detailed description that follows. It should be appreciated that like reference numerals are used to identify like elements illustrated in one or more of the figures.

DETAILED DESCRIPTION

Various examples of aircraft wiring racetracks are described herein. In certain examples, the wiring racetrack can include a first wire group, a second wire group, and a wiring pallet. The first wire group includes wires of exclusively a first category. The second wire group includes wires of exclusively a second category distinct from the first category. The wiring pallet can include a first track and a second track. The first wire group can be contained exclusively within the first track. The second wire group can be contained exclusively within the second track. In certain examples, a first connector can be electrically coupled to each of the wires of the first wire group and a second connector can be electrically coupled to each of the wires of the second wire group.

The systems and techniques described herein allow for modular electrical systems to be incorporated into an aircraft. Additionally, the systems and techniques allow for automated manufacturing of the electrical racetracks. As such, recurring electrical fabrication and installation costs can be reduced. Additionally, electrical racetracks can be improved in quality, maintainability, organization, space efficiency, and reliability. Furthermore, the modular nature of the systems can allow for reduced engineering costs and increase the ease of design.

Figure 1:
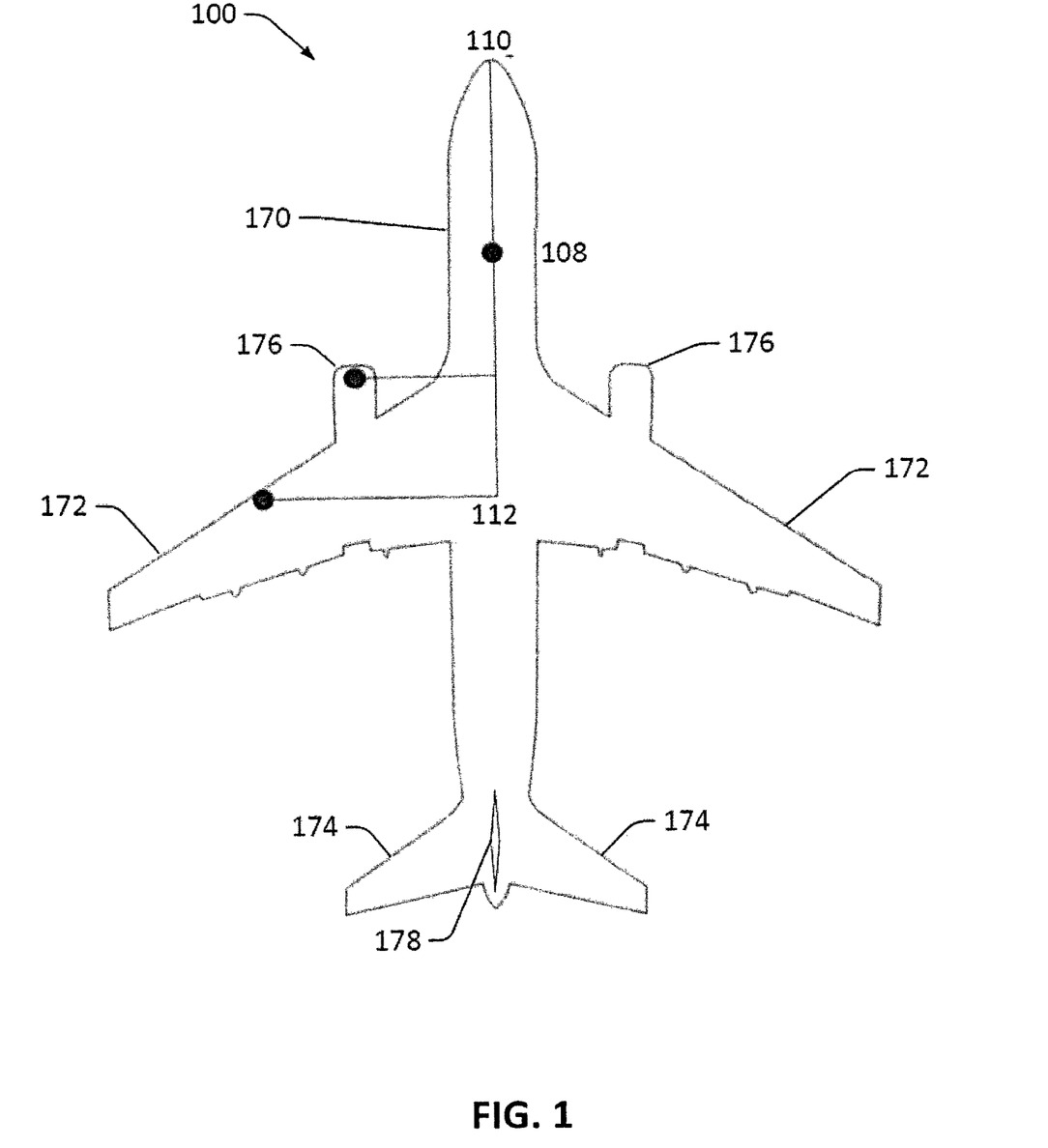
FIG. 1 illustrates an aircraft in accordance with an example of the disclosure.

FIG. 1 illustrates an aircraft in accordance with an example of the disclosure. The aircraft 100 of FIG. 1 can include fuselage 170, wings 172, horizontal stabilizers 174, aircraft engines 176, and vertical stabilizer 178. Additionally, aircraft 100 can include cockpit electronics 110, controller 108, and wiring 112.

Aircraft 100 described in FIG. 1 is exemplary and it is appreciated that in other examples, aircraft 100 can include more or less components or include alternate configurations. Additionally, concepts described herein can be extended to other aircraft such as helicopters, drones, missiles, etc.

Cockpit electronics 110 can be electronics for control or operation of various systems of the aircraft 100. Cockpit electronics 110 can be disposed within the cockpit of the aircraft 100. Cockpit electronics 110 can be electrically coupled (e.g., coupled so that electrical current can be communicated) to one or more other systems of the aircraft 100 through wiring 112. Wiring 112 can be a wiring system that includes electrical wires disposed within one or more wiring racetracks. Wiring 112 can include subsystems that are electrically coupled with various connectors.

Wiring 112 can, thus, couple the cockpit electronics 110 to systems such as controller 112, aircraft engines 176, and various cabin systems, flight control systems, communications systems, and other systems. Additionally, wiring 112 can also electrically couple other electrical systems of the aircraft 100, additional or alternative to the cockpit electronics 110.

Controller 108 and cockpit electronics 110 can include, for example, a microprocessor, a microcontroller, a signal processing device, a memory storage device, and/or any additional devices to perform any of the various operations described herein. In various examples, controller 108 and/or its associated operations can be implemented as a single device or multiple connected devices (e.g., communicatively linked through wired or wireless connections such as wiring 112).

Thus, cockpit electronics 110 and controller 108 can include one or more memory components or devices to store data and information. The memory can include volatile and non-volatile memory. Examples of such memory include RAM (Random Access Memory), ROM (Read-Only Memory), EEPROM (Electrically-Erasable Read-Only Memory), flash memory, or other types of memory. In certain examples, cockpit electronics 110 and controller 108 can be adapted to execute instructions stored within the memory to perform various methods and processes described herein, including implementation and execution of control algorithms responsive to sensor and/or operator (e.g., flight crew) inputs.

Wings 172, horizontal stabilizers 174, and vertical stabilizers 178, as well as inlets of aircraft engines 176 and portions of the fuselage 170 can be referred to herein as aerodynamic surfaces. Aerodynamic surfaces can be surfaces that generate lift, downforce, and/or otherwise affect the stability or flight of the aircraft 100.

Figure 2:
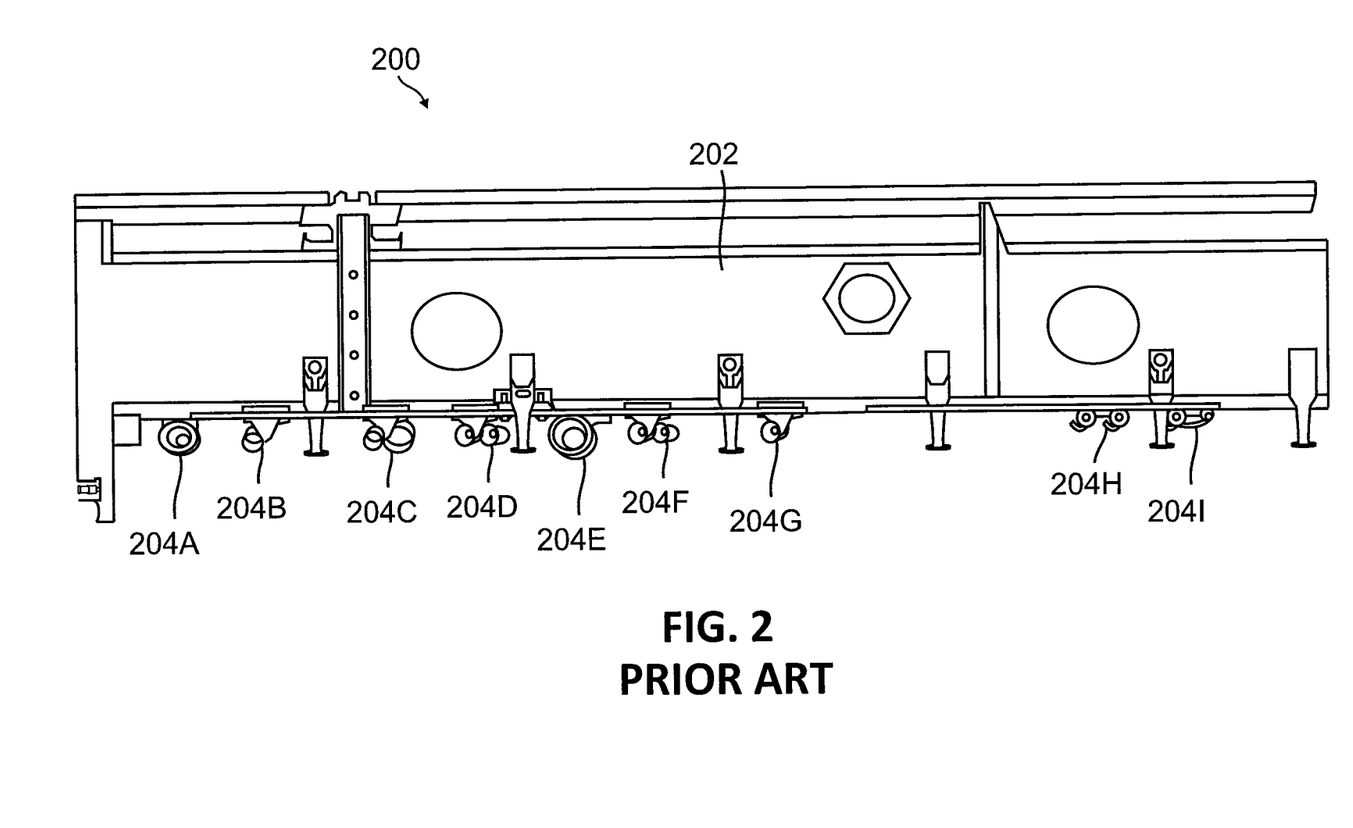
FIG. 2 illustrates a prior art wiring racetrack in accordance with an example of the disclosure.

FIG. 2 illustrates a prior art wiring racetrack in accordance with an example of the disclosure. FIG. 2 is a cross-sectional view of wiring racetrack 200. Wiring racetrack 200 is an example of a conventional wiring racetrack installed on an aircraft.

Wiring racetrack 200 includes a raceway 202 with wiring bundles 204A-I coupled to wiring raceway 202. Wiring bundles 204A-I can be pre-fabricated wiring bundles that each include one or more wires.

The Federal Aviation Administration (FAA), as well as other regulatory bodies, specifies different categories of wires depending on systems that the wires are associated with, their gauge, the amount of current carried, and/or due to other factors. One or more of wiring bundles 204A-I can contain a plurality of different types of wires of different categories. As such, one or more wiring bundles 204A-I can include mixed categories of wires. Furthermore, the wires of the same or a similar category can be dispersed across many different locations on wiring raceway 202. Thus, design, fabrication, and maintenance of the wiring racetrack 200 can require a significant amount of time and manpower.

Thus, each wire of wiring bundles 204A-I is assigned a unique category based on separation and redundancy requirements (e.g., as dictated by a certification authority). For example, a wire of one category can be assigned to control a specific aerodynamic surface on the wing. Based on this categorization, that wire should be separated from other wires that control, for example, the lights, sensors, different control surfaces, or other parts of the aircraft. Wires associated with different systems of the aircraft are thus divided into separate routing paths (groups or categories) based on certification requirements for separation and/or redundancy purposes.

Figure 3:
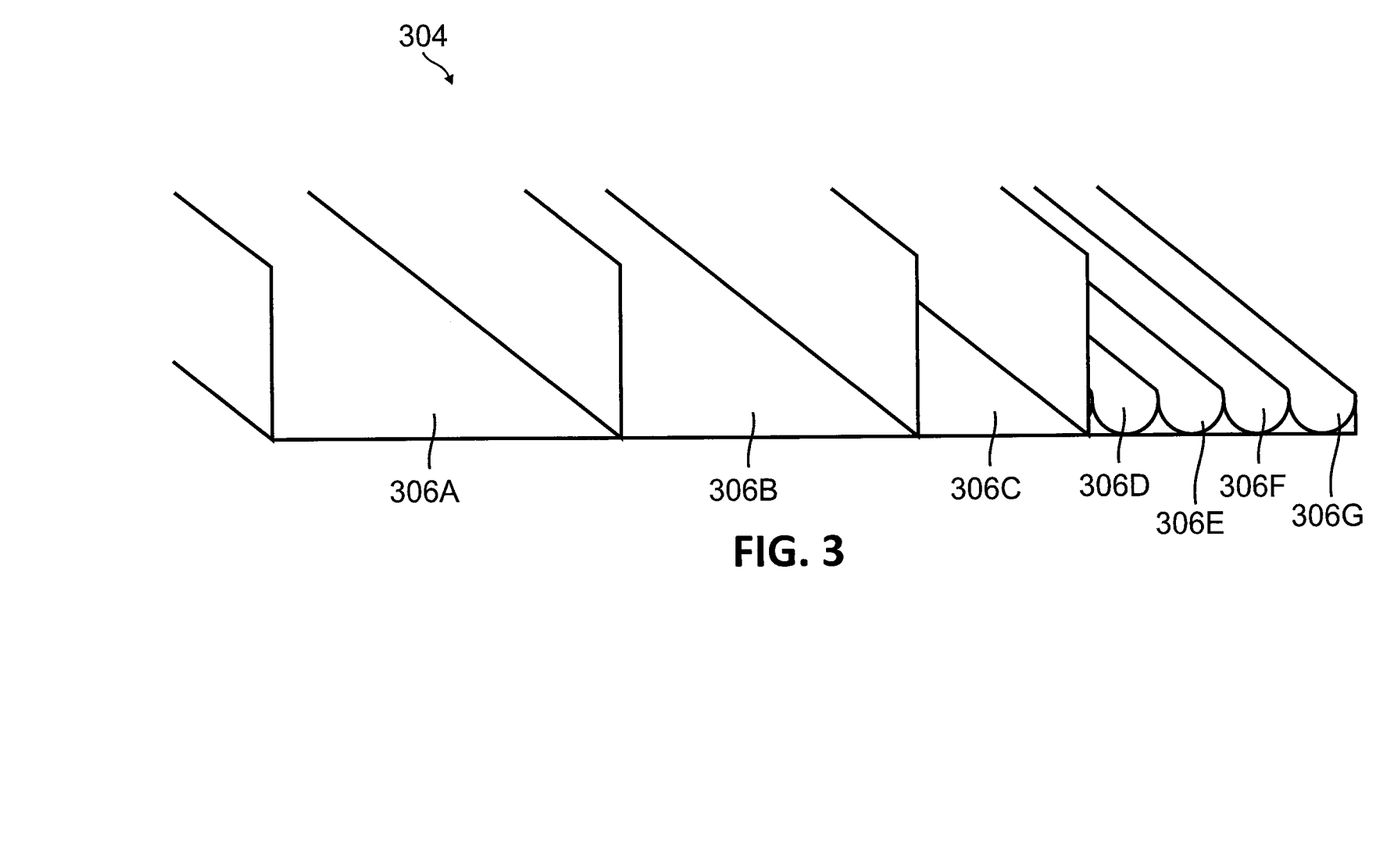
FIG. 3 illustrates a wiring pallet in accordance with an example of the disclosure.

FIG. 3 illustrates a wiring pallet in accordance with an example of the disclosure. FIG. 3 illustrates a wiring pallet 304 with tracks 306A-G. Each of tracks 306A-G can be configured to each contain a limited number of categories of wires (e.g., one or two different categories of wires). One or more of tracks 306A-G can be different sizes depending on the number and volume of wiring for each wiring category.

While FIG. 3 illustrates wiring pallet 304 with open channels, one, more than one, or all sections of other examples of wiring pallet 304 can include closed channels. Wiring pallet 304 can be divided into one or more sections. The sections can be combined to constitute wiring pallet 304.

Figure 4:
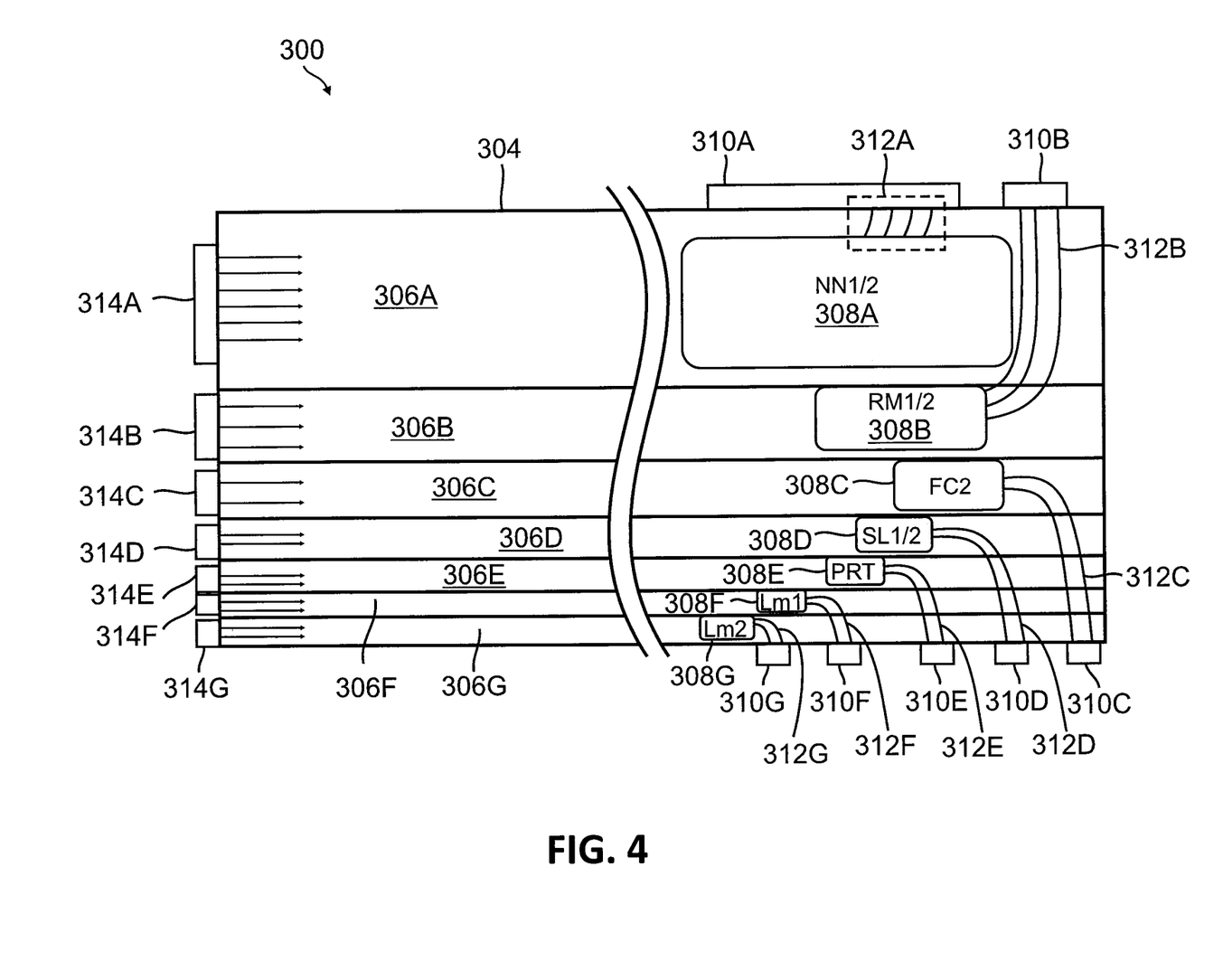
FIG. 4 illustrates a wiring racetrack in accordance with an example of the disclosure.

FIG. 4 illustrates a wiring racetrack in accordance with an example of the disclosure. FIG. 4 illustrates wiring racetrack 300 with wiring pallet 304 and wiring groups 308A-G. Each of wiring groups 308A-G can be accordingly disposed within tracks 306A-G of wiring pallet 304. Thus, wiring group 308A can be disposed without track 306A while wiring group 308B can be disposed within track 306B.

Wiring groups 308A-G can be groups with certain specific categories of wires. Thus, for example, wiring group 308A can be a group of NN1/2 wires. Wiring group 308B can be a group of RM1/2 wires. Wiring group 308C can be a group of FC2 wires. Wiring group 308D can be a group of SL1/2 wires. Wiring group 308E can be a group of PR1 wires. Wiring group 308F can be a group of SR2 wires. Wiring group 308G can be a group of LM2 wires. Such wiring categories can be in accordance with FAA specified categories (e.g., separation codes, redundancy, electromagnetic effects, etc.) or other categorization types.

In certain examples, the wiring groups 308A-G can have more than one category of wires by, for example, additionally including neutral wires (e.g., ground wires, intrinsically safe wiring, etc.) within the group that do not belong to any specific category. Nonetheless, it is appreciated that the wires of a specific category can be exclusively organized into a wiring group. Such a configuration can simplify installation of wires into any associated connectors (e.g., as only one type of wiring is in a group, the connector insert cavity utilization can be optimized).

As shown in FIG. 4, the different wiring groups can be different sizes and contain different numbers of wires. Thus, for example, wiring group 308A can include 300-500 wires and be a bundle approximately 1.5 to 3 inches in diameter.

Wiring group 308B can include 25-50 wires and be a bundle approximately 1 to 2 inches in diameter. Wiring group 308C can include 30-60 wires and be a bundle approximately 0.75 to 1.25 inches in diameter. Wiring group 308D can include 30-60 wires and be a bundle approximately 0.5 to 1 inch in diameter. Wiring group 308E can include 2-4 wires and be a bundle approximately 0.25 to 0.75 inches in diameter. Wiring group 308F can include 5-10 wires and be a bundle approximately 0.25 to 0.5 inches in diameter. Wiring group 308G can include 2-6 wires and be a bundle approximately 0.1 to 0.25 inches in diameter.

The various wires of the wiring groups can be electrically coupled (e.g., can pass electrical current and/or signals to and receive such current and/or signals from) to one or more connectors. Thus, for example, wiring groups 308A-G can be coupled to connectors 310A-G, respectively, on a first end of the wires and coupled to connectors 314A-G, respectively, on a second end of the wires. Certain examples can electrically couple all the wires of a single wiring group to a single connector, but other examples can electrically couple the wires of a single wiring group to a plurality of connectors to, for example, interface with a plurality of systems.

Connectors 310A-G can be connectors disposed along one or more lateral sides (e.g., as compared to the directions that the wires run) of wiring pallet 304. Connectors 310A-G can be configured to be connected to one or more wiring systems of an aircraft. Disposing connectors 310A-G along the lateral sides of wiring pallet 304 can allow for simplified electrical connections to electrical systems of the aircraft disposed to the lateral sides of the wiring pallet 304. Wiring groups 308A-G can be connected to respective connectors 310A-G via wiring 312A-G, respectively.

In certain examples, connectors 310A-G can be integrated along the sides of wiring pallet 304 to allow for a solid connection. Other examples can allow for connectors 310A-G to be relatively loose (e.g., can be moved relative to wiring pallet 304).

Connectors 314A-G can be connectors disposed within or at the end of tracks 306A-G, respectively. Connectors 314A-G can, thus, electrically couple with other connectors in a longitudinal direction. As such, connectors 314A-G can, for example, allow for electrical coupling to another wiring racetrack or other electrical systems. Longitudinal connectors can also allow for easy extension of the lengths of wiring racetrack 300, allowing for a modular system where longer wiring racetracks can be created (e.g., for longer aircraft) through a combination of multiple racetracks. Through a combination of longitudinal and lateral connectors, wiring racetrack 300 can be connected to various other electrical systems of the aircraft and/or other wiring racetracks to form a modular electrical system.

Figure 5:
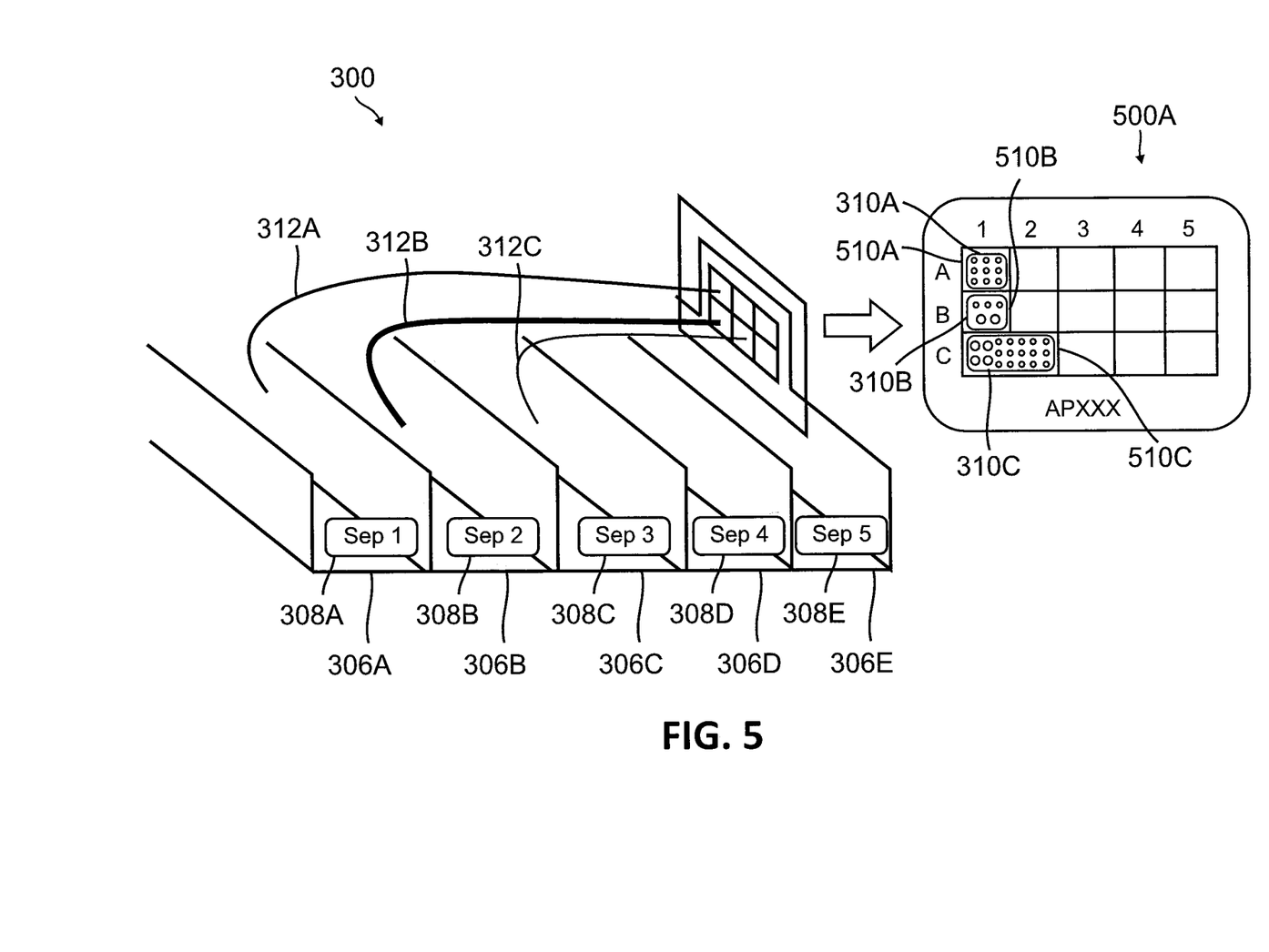
FIG. 5 illustrates a racetrack wiring system in accordance with an example of the disclosure.

FIG. 5 illustrates a racetrack wiring system in accordance with an example of the disclosure. FIG. 5 illustrates wiring racetrack 300 electrically coupled to connector panel 500.

Connector panel 500 can include one or more receiver connectors (i.e., mating connectors), such as receiver connectors 510A-C, configured to mate to connectors of the wiring groups. Each receiver connector can include features (e.g., geometric features, dimensions, lead-ins, and other features) that allow for the receiver connector to only connect with a specific connector of the wiring group. Accordingly, the connectors (e.g., connectors 310A-C) of the wiring groups (e.g., of wiring groups 308A-C) can be connected to receiver connectors (e.g., receiver connectors 510A-C) of connector panel 500.

Each of the receiver connectors 510A-C can, in certain examples, be configured to receive only wires of a specific category of only wires of such a category as well as any neutral or intrinsically safe wires. Thus, fabrication of the connector panel 500 (e.g., connection of wires to the connector) can be simplified by having only one category of wire be connected to a multiple contact connector.

As shown in FIG. 5, connector panel 500 is disposed lateral to wiring racetrack 300. Other examples can dispose connector panels longitudinally to the wiring racetrack or in other configurations. Connector panel 500 can allow for all wires of a wiring group of the wiring racetrack 300 to be easily coupled to a corresponding receiver connector, decreasing installation time. Furthermore, positioning connector panel 500 lateral to wiring racetrack 300 can allow for more direct electrical connections to systems disposed to the side of wiring racetrack 300. Certain such systems are shown in FIG. 6.

Figure 6:
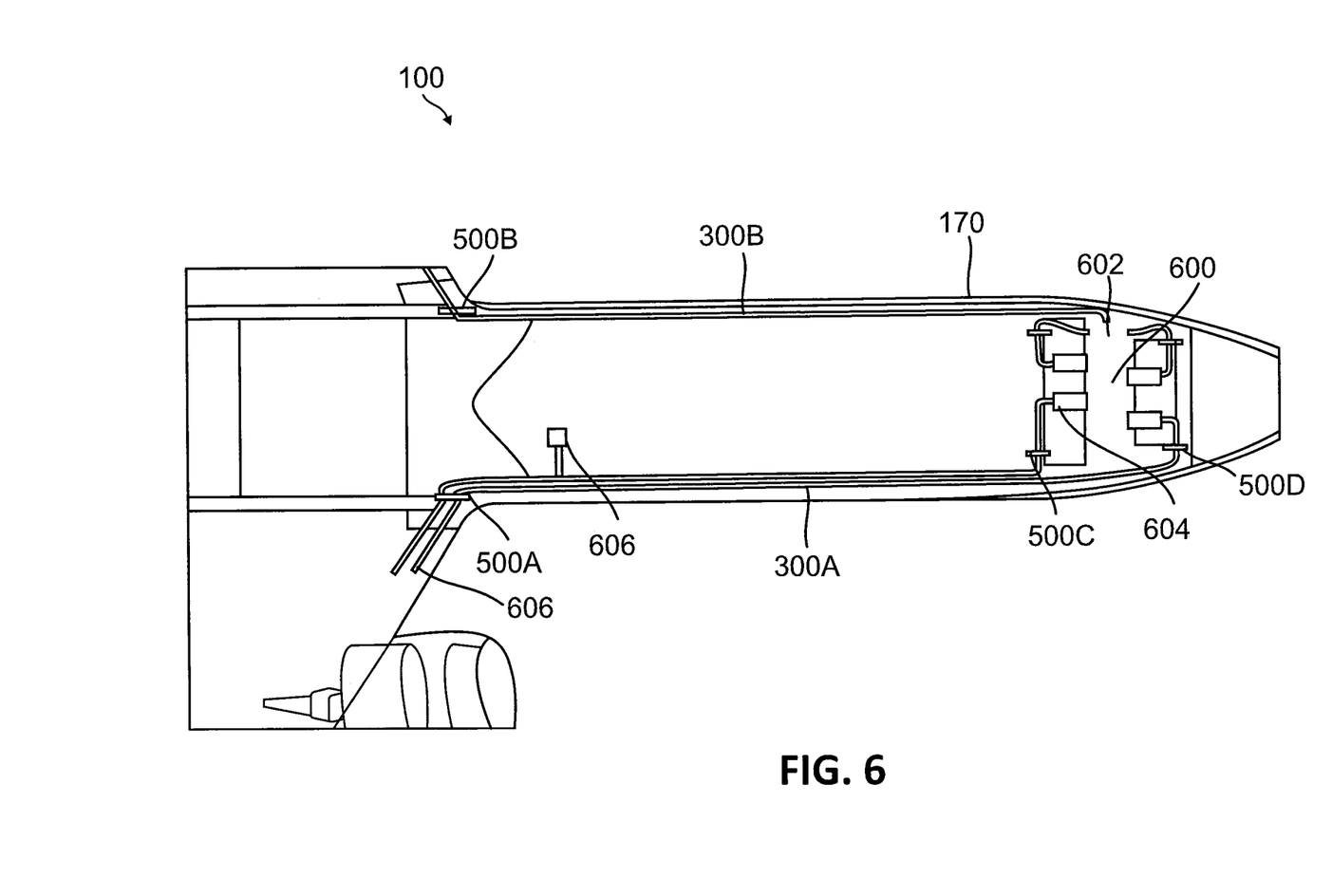
FIG. 6 illustrates an aircraft with a racetrack wiring system in accordance with an example of the disclosure.

FIG. 6 illustrates an aircraft with a racetrack wiring system in accordance with an example of the disclosure. FIG. 6 illustrates aircraft 100 with wiring racetracks 300A and 300B disposed within left and right portions of the fuselage 170. In certain examples, all wiring within a section of the fuselage 170 can be contained within the respective wiring racetracks 300A and 300B. Aircraft 100 also includes secondary routing pathway 600 with integration panel 602 and connector 604. Aircraft 100 additionally includes tertiary routing pathways 606.

Wiring racetrack 300A can be electrically coupled to secondary routing pathway 600 via connector panels 500C and 500D. Connectors panels 500C and 500D can be electrically coupled to integration panel 602 and connector 604. Thus, electrical current and/or signals from wires of wiring racetrack 300A can be communicated to secondary routing pathway 600. Wiring racetrack 300A can also be electrically coupled to tertiary routing pathways 606 through, for example, connector panel 500A. Wiring racetrack 300B can be electrically coupled to connector panel 500B and electrically coupled to secondary routing pathway 600 through other connector panels.

As shown in FIG. 6, wiring racetracks 300A and 300B are substantially straight. Electrical connections to systems to the side of wiring racetracks 300A and 300B are connected through corresponding connector panels. Thus, wiring racetracks 300A and 300B can include connectors disposed on lateral sides of wiring racetracks 300A and 300B to electrically couple to such connectors. Fabricating wiring racetracks 300A and 300B to be substantially straight allows for simplified manufacturing as wires would only be required to be run substantially linearly. Bends and/or angular connections in such electrical connections can then be interfaced through corresponding connector panels and/or other connectors.

Figure 7:
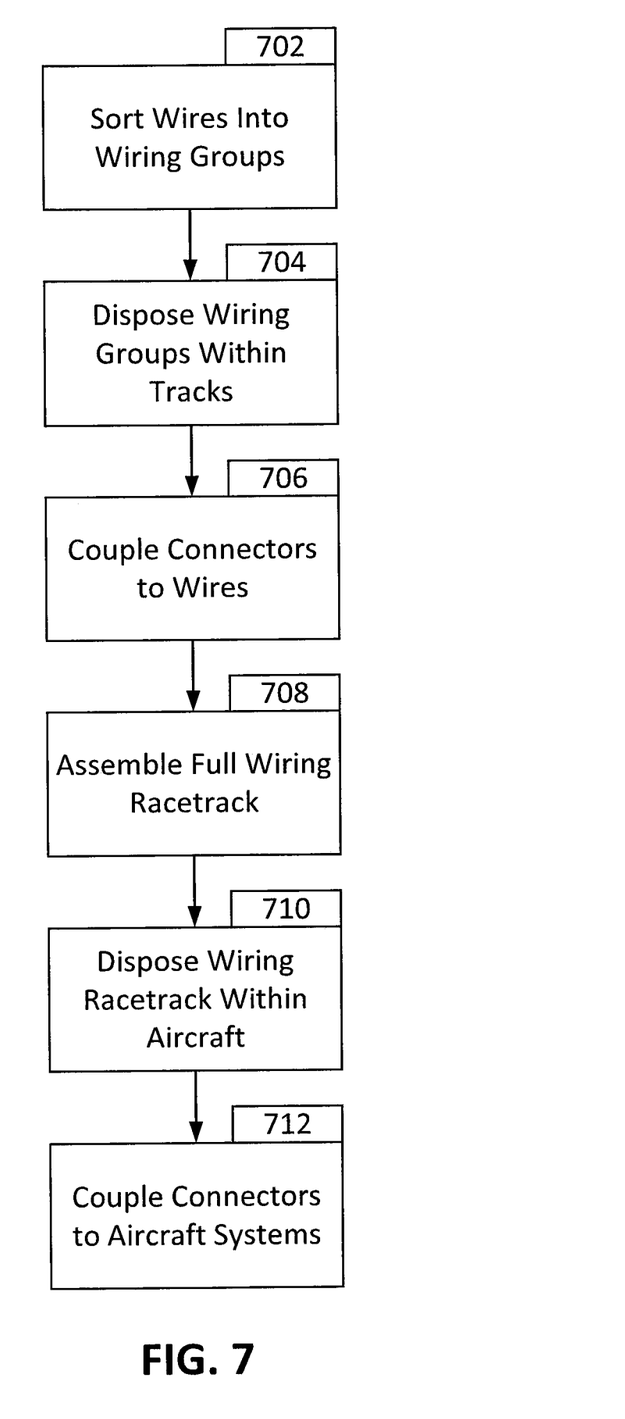
FIG. 7 is a flowchart detailing a method of fabricating a racetrack wiring system in accordance with an example of the disclosure.

FIG. 7 is a flowchart detailing a method of fabricating a racetrack wiring system in accordance with an example of the disclosure. In certain examples, portions or all of the technique detailed in FIG. 7 can be performed by one or more robots or through automated manufacturing.

In block 702, a plurality of wires can be sorted into at least a first wire group and a second wire group. In certain examples, the first wire group can include wires of exclusively a first category or include wires of the first category and neutral wires. Additionally, the second wire group can include wires of exclusively a second category distinct from the first category or include wires of the second category and neutral wires. Certain other wires can be sorted into additional wire groups of additional categories.

In block 704, a wiring pallet can be fabricated. The wiring pallet can include a plurality of tracks. The wiring pallet can be, for example, a pallet with a plurality of distinct open or closed channels. The first wire group can be disposed within a first track of the wiring pallet. The second wire group can be disposed within a second track of the wiring pallet. Other wiring groups can also be disposed within their own separate tracks of the wiring pallet.

In certain examples, block 704 can be performed by holding the wiring pallet within a gantry. Additionally, the wiring groups can be tagged according to the separation code of the wiring group. A robot can scan the tags to determine the respective group of the wiring groups. The robot can then dispose the wiring groups within the appropriate tracks of the wiring pallet by gripping each of the wiring groups with an end effector and disposing the wiring groups within the respective tracks. An example of such a robot is described in FIG. 8.

In block 706, the wiring groups can be electrically coupled to corresponding connectors. Thus, the first wiring group can be electrically coupled to a first connector and the second wiring group can be coupled to a second connector. Additional operations to finish the full wiring racetrack can be performed in block 708. Such additional operations can include, for example, coupling connectors to portions of the wiring racetrack, further cable management, and other processes.

In block 710, the full wiring racetrack is assembled to an aircraft. The wiring racetrack can, thus, be disposed within a section of the aircraft. Certain aircraft can require a plurality of wiring racetracks. Such aircraft can be fitted accordingly.

In block 712, aircraft electrical systems can be coupled to the wiring racetrack. Accordingly, one or more wiring groups can be electrically coupled to one or more aircraft systems. Such electrical coupling can include, for example, hard wiring, connectors, and/or other techniques. The wiring racetrack can thus be integrated with other electrical systems of the aircraft and, thus, provide electrical power and signal transmission to and from the systems.

Figure 8:
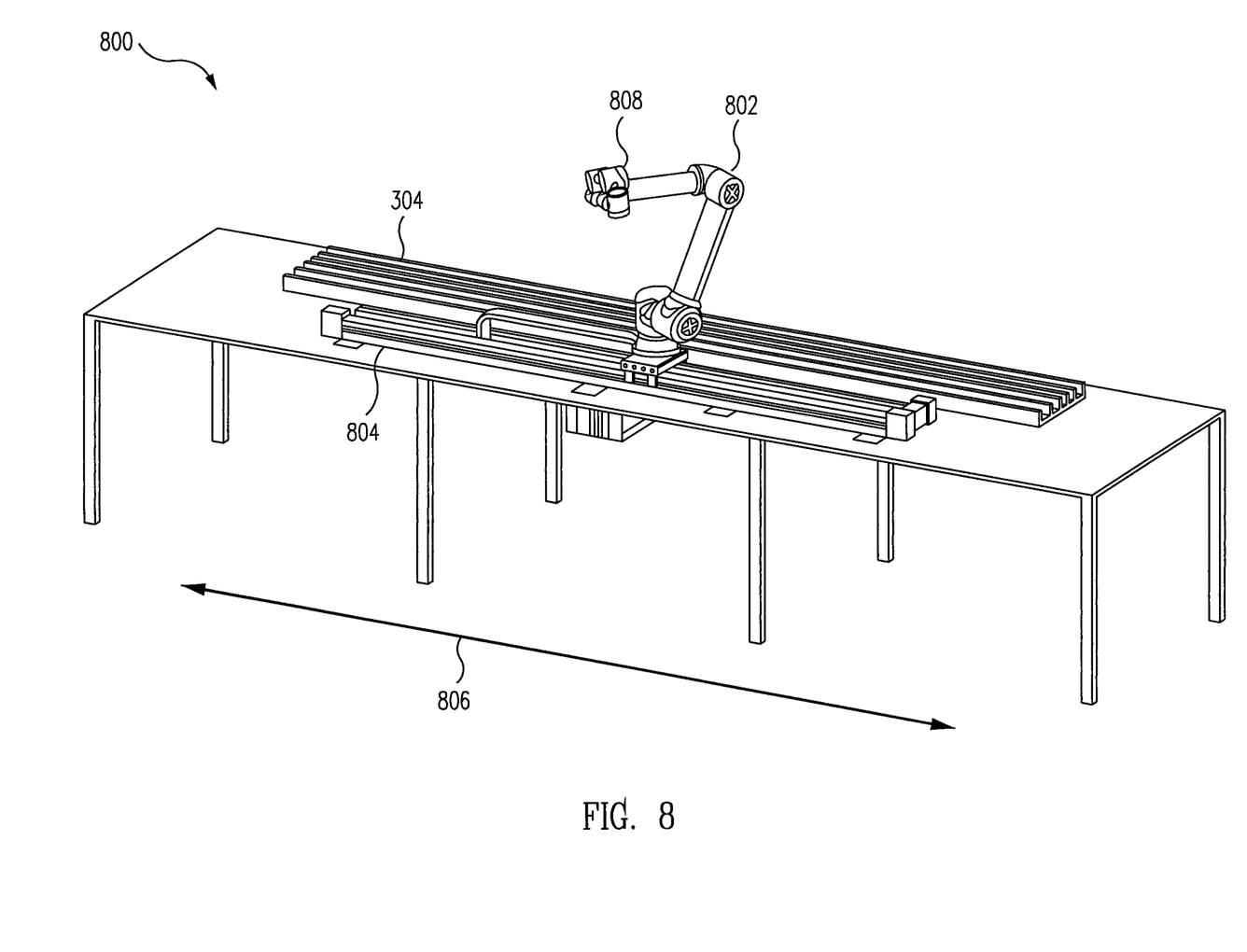
FIG. 8 illustrates a robotic system in accordance with an example of the disclosure.

FIG. 8 illustrates a robotic system in accordance with an example of the disclosure. FIG. 8 illustrates a robotic system 800 that includes a robot arm 802, a robotic transfer unit (RTU) 804, an end effector 808 coupled to the robot arm 802, and wiring pallet 304.

RTU 804 can move robot arm 802 along direction 806 (e.g., forwards and backwards along direction 806). RTU 804 can include associated wire routing and components for moving robot arm 804. RTU 804 can be configured to move robot arm 804 in one or more directions to wiring pallet 304.

In certain examples, robot arm 802 can include one or more scanners configured to scan wiring groups and dispose the wiring groups within appropriate channels of wiring pallet 304. Thus, for example, the wiring groups can be tagged with the separation code of the wiring group. A scanner of robot arm 802 can then scan the tag to determine the respective group for the wiring group. Robot arm 802 can then handle (e.g., pick up or otherwise) the wiring group with end effector 808 to dispose the wiring group within the appropriate channel of wiring pallet 304.

Additionally, in certain examples, digital data can be used to control the design and manufacturing of wiring racetracks. Thus, for example, the wires of separate wiring groups are each sorted and/or tagged by digital data that assigns the appropriate connector termination location and category to each individual wire. The scanner of robot arm 802 can scan the tagged data. End effector 808 can then, using this data, couple the individual wires with the appropriate connector. Thus, for example, end effector 808 can couple a first wire with a first connector on a first end for a first group, dispose of the first group within an assigned track of wiring pallet 304, and couple the first wire with a second connector on a second end for the first group. Furthermore, end effector 808 can additionally couple individual wires (e.g., a second wire) of a second group with a first connector (e.g., the first connector coupled to the first group, for shared connectors, or a different first connector), dispose of the wires of the second group in the assigned track and couple the individual wires of the second group with another connector on a second end. Accordingly, manufacture of the wiring groups and wiring racetracks can be automated.

Examples described above illustrate but do not limit the invention. It should also be understood that numerous modifications and variations are possible in accordance with the principles of the present invention. Accordingly, the scope of the invention is defined only by the following claims.

What is claimed is:

1. An aircraft comprising:
   cockpit electronics configured to control the aircraft;
   a fuselage comprising:
      a wiring racetrack comprising:
         a first wire group comprising a plurality of wires of exclusively a first category assigned to control a first part of the aircraft from the cockpit electronics;
         a second wire group comprising a plurality of wires of exclusively a second category assigned to control a second part of the aircraft from the cockpit electronics, the second category being distinct from the first category, the second part being distinct from the first part;
         a wiring pallet comprising a first track and a second track, wherein the wires of the first category are contained exclusively within the first track, and wherein the wires of the second category are contained exclusively within the second track;
         a first connector electrically coupled to each of the wires of the first wire group; and
         a second connector electrically coupled to each of the wires of the second wire group; and
      secondary wiring comprising one or more connectors electrically coupled to the first connector, the second connector, or to both the first connector and the second connector.

2. The aircraft of claim 1, wherein:
   the first track and the second track are channels within the wiring pallet; and
   each of the first and second parts is one of (i) an aerodynamic surface, (ii) lights, (iii) sensors.

3. The aircraft of claim 1, wherein:
   the fuselage comprises a fuselage portion comprising a left portion and a right portion, and wherein the wiring racetrack is disposed within the left portion or the right portion; and
   the first part is an aerodynamic surface.

4. The aircraft of claim 3, wherein all of the wiring of the left portion or the right portion of the fuselage is contained within the wiring pallet.

5. The aircraft of claim 1, wherein the first category and the second category are wire categories defined by a regulatory body.

6. The aircraft of claim 1, wherein the first connector and the second connector are coupled to a mating connector, wherein the wiring pallet is substantially linear, and wherein the first connector and the second connector are configured to couple to the mating connector disposed at an angle to the wiring pallet.

7. The aircraft of claim 1, wherein the wiring racetrack further comprises a neutral wire group comprising one or more wires of a third category, wherein the neutral wire group is dispersed within both the first wire group and the second wire group.

8. A method of fabricating the wiring racetrack of claim 1, the method comprising:
   sorting a plurality of the wires into at least the first wire group and the second wire group, wherein the first wire group comprises one or more of the wires of exclusively the first category and the second wire group comprises one or more of the wires of exclusively the second category distinct from the first category;
   disposing the first wire group exclusively within the first track of the wiring pallet;
   disposing the second wire group exclusively within the second track of the wiring pallet;
   electrically coupling the first connector to each of the wires of the first wire group; and
   electrically coupling the second connector to each of the wires of the second wire group.

9. The method of claim 8, further comprising:
   disposing the wiring racetrack within the fuselage of an aircraft.

10. The method of claim 9, further comprising coupling the first connector and the second connector to a mating connector disposed on the aircraft, wherein the mating connector is disposed at an angle to the wiring pallet.

11. The method of claim 8, wherein the fabricating the wiring racetrack is automatically performed by one or more robots comprising a gantry configured to hold the wiring pallet and an end effector configured to dispose the first wire group within the first track or dispose the second wire group within the second track.

12. The method of claim 8, wherein the first track and the second track are channels within the wiring pallet.

13. The method of claim 8, wherein the sorting the plurality of the wires comprises scanning the plurality of the wires to identify each of the plurality of the wires as belonging to the first wire group or the second wire group, and wherein the scanning the plurality of the wires comprises scanning a separation code for each of the plurality of the wires.

14. The method of claim 8, wherein the fabricating the wiring racetrack is automatically performed by one or more robots mounted on a robotic transfer unit (RTU) disposed proximate to the wiring pallet and an end effector configured to dispose the first wire group within the first track, dispose the second wire group within the second track, or both.

15. The method of claim 8, wherein the disposing the first wire group within the first track comprises scanning the first wire group and disposing the first wire group within the first track based on the scanning, and wherein the disposing the second wire group within the second track comprises scanning the second wire group and disposing the second wire group within the second track based on the scanning.

16. An aircraft wiring racetrack comprising:
   a first wire group comprising a plurality of wires of exclusively a first category assigned to control a first part of the aircraft from cockpit electronics;
   a second wire group comprising a plurality of wires of exclusively a second category assigned to control a second part of the aircraft from the cockpit electronics, the second category being distinct from the first category, the second part being distinct from the first part;
   a wiring pallet comprising a first track and a second track, wherein the wires of the first category are contained exclusively within the first track, and wherein the wires of the second category are contained exclusively within the second track;
   a first connector electrically coupled to each of the wires of the first wire group; and
   a second connector electrically coupled to each of the wires of the second wire group.

17. The aircraft wiring racetrack of claim 16, wherein the first track and the second track are channels within the wiring pallet.

18. The aircraft wiring racetrack of claim 16, wherein the first connector and the second connector are configured to couple to a mating connector, wherein the wiring pallet is substantially linear, and wherein the first connector and the second connector are configured to couple to the mating connector disposed at an angle to the wiring pallet; and
   wherein each of the first and second parts is one of (i) an aerodynamic surface, (ii) lights, (iii) sensors.

19. The aircraft wiring racetrack of claim 16, wherein the first category and the second category are wire categories defined by a regulatory body.

20. The aircraft wiring racetrack of claim 16, further comprising a neutral wire group comprising one or more wires of a third category, wherein the neutral wire group is dispersed within both the first wire group and the second wire group; and
   wherein the first part is an aerodynamic surface, and the second part is one of (i) an aerodynamic surface distinct from the first part, (ii) lights, (iii) sensors.

* * * * *